US012609803B2

(12) United States Patent
Zhang et al.

(10) Patent No.: US 12,609,803 B2
(45) Date of Patent: Apr. 21, 2026

(54) METHOD FOR UPLINK TRANSMISSION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yi Zhang, Dongguan (CN); Jing Xu, Dongguan (CN); Bin Liang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 286 days.

(21) Appl. No.: 18/490,062

(22) Filed: Oct. 19, 2023

(65) Prior Publication Data

US 2024/0080167 A1 Mar. 7, 2024

Related U.S. Application Data

(63) Continuation of application No. PCT/CN2021/091390, filed on Apr. 30, 2021.

(51) Int. Cl.
H04L 5/00 (2006.01)
H04L 1/1812 (2023.01)
H04W 72/0446 (2023.01)

(52) U.S. Cl.
CPC .......... H04L 5/0055 (2013.01); H04L 1/1812 (2013.01); H04W 72/0446 (2013.01)

(58) Field of Classification Search
CPC ... H04L 5/0055; H04L 1/1812; H04L 1/1854; H04L 1/1896; H04W 72/0446; H04W 72/232

(Continued)

(56) References Cited

U.S. PATENT DOCUMENTS

2020/0037245 A1 1/2020 Lu et al.
2021/0112578 A1* 4/2021 Yang ..................... H04L 5/0094
(Continued)

FOREIGN PATENT DOCUMENTS

CN 110475359 A 11/2019
CN 112217619 A 1/2021
(Continued)

OTHER PUBLICATIONS

Huawei, "Discussion on multi-carrier scheduling using single PDCCH", R1-2007580, Oct. 26-Nov. 13, 2020 (From Applicant' IDS) (Year: 2020).*
2022/0174707
A1

6/2022
Kim et al.
2022/0239445
A1

7/2022
Yoshioka et al.

*Primary Examiner* — Mang Hang Yeung
(74) *Attorney, Agent, or Firm* — Hodgson Russ LLP

(57) ABSTRACT

A method for uplink transmission, a terminal device, and a network device are provided. The method includes the following. A terminal device receives a downlink control information (DCI) from a network device, where the DCI is used to schedule physical downlink shared channels (PD-SCHs) of at least two serving cells. The terminal device transmits hybrid automatic repeat request (HARD)-acknowledgement (ACK) information corresponding to the PDSCHs of the at least two serving cells on a first physical uplink control channel (PUCCH) resource.

12 Claims, 4 Drawing Sheets

(58) Field of Classification Search
USPC .......................................................... 370/329
See application file for complete search history.

(56) References Cited

FOREIGN PATENT DOCUMENTS

| CN | 112217621 A | 1/2021 |
|----|-------------|--------|
| WO | 2020204561 | 10/2020 |
| WO | 2020225917 | 11/2020 |

OTHER PUBLICATIONS

Huawei et al., "Discussion on multi-carrier scheduling using single PDCCH," 3GPP TSG RAN WG1 Meeting #103-e, R1-2007580, Oct. 2020.

EPO, Extended European Search Report for EP Application No. 21938451.8, Mar. 27, 2024.
OPPO "Discussion on multi-cell PDSCH scheduling via a single DCI" 3GPP TSG RAN WG1 #104-e R1-2100187, Jan. 25-Feb. 5, 2021. 9 pages.
Moderator(Nokia) [102-e-NR-MRDC-CA-Cross-CC-Unaligned-CA] email discussion summary 3GPP TSG RAN WG1 #102e_ Meeting, R1-200xxxx X-CC sched and CSI-RS V003-Samsung_ Intel, Aug. 17-28, 2020. Retrieved from: https://www.3gpp.org/ftp/ tsg_ran/WG1_RL1/TSGR1_102-e/Inbox/drafts/7.2.10/%5B102-e-NR-MRDC-CA-Cross-CC-Unaligned-CA?sortby=sizerev 18 pages.
WIPO, International Search Report and Written Opinion for International Application No. PCT/CN2021/091390, Jan. 28, 2022.
EPO, Communication for EP Application No. 21938451.8, Feb. 4, 2025.

* cited by examiner

METHOD FOR UPLINK TRANSMISSION, TERMINAL DEVICE, AND NETWORK DEVICE

CROSS REFERENCE TO RELATED APPLICATION(S)

This application is a continuation of International Application No. PCT/CN2021/091390, filed Apr. 30, 2021, the entire disclosure of which is incorporated herein by reference.

TECHNICAL FIELD

The disclosure relates to the field of communication technology, and more particularly, to a method for uplink transmission, a terminal device, and a network device.

BACKGROUND

Release 17 (Rel-17) needs to better support dynamic spectrum sharing (DSS) for long term evolution (LTE) and new radio (NR). On carriers where LTE and NR coexist, in order to avoid interference to LTE systems, resources where LTE cell reference signals (CRSs) and LTE physical uplink control channels (PDCCHs) are located cannot be used for NR transmission. Therefore, on carriers where LTE and NR coexist, the capacity of NR PDCCHs will be affected. Therefore, a new mechanism is needed to solve the capacity problem of the NR PDCCH.

SUMMARY

In a first aspect, implementations of the disclosure provide a method for uplink transmission. The method includes the following. A terminal device receives a downlink control information (DCI) from a network device, where the DCI is used to schedule physical downlink shared channels (PDSCHs) of at least two serving cells. The terminal device transmits hybrid automatic repeat request (HARD)-acknowledgement (ACK) information corresponding to the PDSCHs of the at least two serving cells on a first physical uplink control channel (PUCCH) resource.

In a second aspect, implementations of the disclosure provide a terminal device. The terminal device includes a transceiver, a memory configured to store computer programs, and a processor configured to execute the computer programs stored in the memory to cause the transceiver to: receive a DCI from a network device, where the DCI is used to schedule PDSCHs of at least two serving cells, and transmit HARQ-ACK information corresponding to the PDSCHs of the at least two serving cells on a first PUCCH resource.

In a third aspect, implementations of the disclosure provide a network device. The network device includes a transceiver, a memory configured to store computer programs, and a processor configured to execute the computer programs stored in the memory to: transmit a DCI to a terminal device, where the DCI is used to schedule PDSCHs of at least two serving cells, and receive HARQ-ACK information corresponding to the PDSCHs of the at least two serving cells from the terminal device on a first PUCCH resource.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly illustrate technical solutions in implementations of the disclosure or the related art, the following will describe the drawings used for describing implementations of the disclosure or the related art.

DETAILED DESCRIPTION

Figure 1:
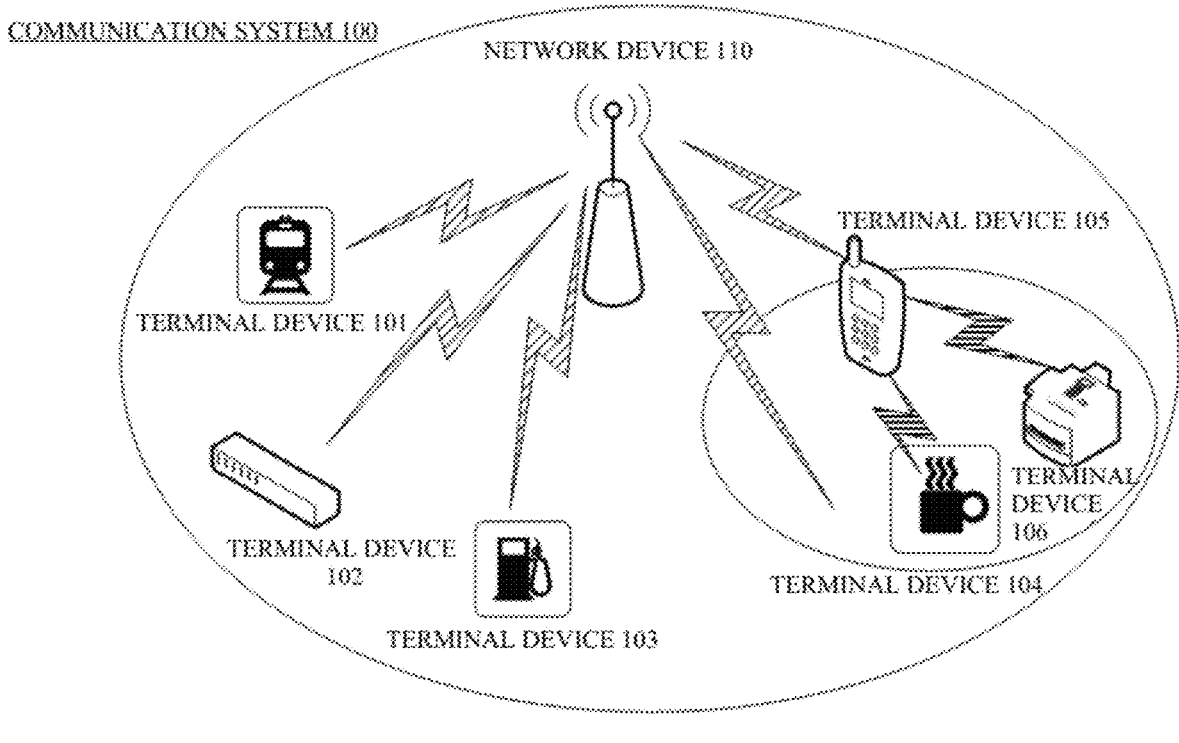
FIG. 1 is a schematic structural diagram of a communication system provided in implementations of the disclosure.

As illustrated in FIG. 1, FIG. 1 is a schematic structural diagram of a communication system 100 provided in implementations of the disclosure. The communication system 100 may include a network device 110 and terminal devices 101 to 106. It should be understood that, more or fewer network devices or terminal devices may be included in the communication system 100 to which the method in implementations of the disclosure may be applied. The network device or the terminal device may be hardware, software divided in terms of function, or a combination thereof. The network device and the terminal device may communicate with each other via another device or network element. In the communication system 100, the network device 110 can transmit downlink data to the terminal devices 101 to 106. The terminal devices 101 to 106 can transmit uplink data to the network device 110. The terminal devices 101 to 106 may be cellular phones, smart phones, portable computers, handheld communication devices, handheld computing devices, satellite radio apparatuses, global positioning systems (GPS), personal digital assistants (PDA), and/or any other suitable devices for communicating on the wireless communication system 100, etc. The network device 110 may be a long term evolution (LTE) network device and/or a new radio (NR) network device, specifically, a NodeB, an eNodeB, a base station in a fifth generation (5G) mobile communication system, a next generation node B (gNB), a base station in a future mobile communication system, or an access node in a wireless fidelity (Wi-Fi) system.

The communication system 100 may employ a public land mobile network (PLMN), a vehicle to everything (V2X) network, a device-to-device (D2D) network, a machine-to machine (M2M) network, an internet of things (IoT), or other networks. In addition, the terminal devices 104 to 106 may also form a communication system. In the communication system, the terminal device 105 can transmit downlink data to the terminal device 104 or the terminal device 106. The method in implementations of the disclosure can be applied in the communication system 100 illustrated in FIG. 1.

(1) A release 15 (Rel-15)/release 16 (Rel-16) hybrid automatic repeat request (HARD)-acknowledgement (ACK) feedback resource is determined as follows.

DCI format 1_0/1_1/1_2 contains the following indicator fields for determining a physical uplink control channel (PUCCH) resource for a HARQ-ACK feedback.

Time domain resource assignment, which indicates a slot offset (k0) between a downlink control information (DCI) scheduling a physical downlink shared channel (PDSCH) and the PDSCH, a start symbol of the PDSCH, the length of the PDSCH (i.e., the number of occupied symbols), and a PDSCH mapping type.

PDSCH-to-HARQ_feedback timing indicator, which indicates a slot offset (k1) between the PDSCH and a corresponding HARQ-ACK feedback.

PUCCH resource indicator, which indicates a PUCCH resource index.

When the terminal device detects a DCI, and a PDSCH scheduled by the DCI ends in slot n, the terminal device transmits a PUCCH carrying corresponding HARQ-ACK information in slot n+k, where k is determined according to a PDSCH-to-HARQ_feedback timing indicator in the DCI. Specifically, the network device configures up to eight PDSCH-to-HARQ-ACK feedback slot offsets for the terminal device via a radio resource control (RRC) signaling, such as dl-DataToUL-ACK, dl-DataToUL-ACK-r16, or dl-DataToUL-ACKForDCIFormat1_2, and then a slot offset is selected from the multiple slot offsets configured via the RRC according to the PDSCH-to-HARQ_feedback timing indicator in the DCI.

The network device configures for the terminal device, via a RRC signaling PUCCH-Config, four PUCCH resource sets corresponding to different ranges of uplink control information (UCI) payload size. Each PUCCH resource set includes multiple PUCCH resource. When transmitting a PUCCH carrying HARQ-ACK information, the terminal device first determines a corresponding PUCCH resource set according to the number of bits of the HARQ-ACK information, and then determines a PUCCH resource in the PUCCH resource set according to an indicator field (i.e., PUCCH resource indicator) contained in the DCI and/or the PDCCH resource carrying the DCI.

(2) HARQ-ACK feedback for dual-connectivity (DC)/carrier aggregation (CA).

When the terminal device operates in a DC/CA mode, a master cell group (MCG) and a secondary cell group (SCG) can be configured by the network device for the terminal device.

MCG: a set of serving cells, including master nodes, where a special cell (SpCell) in the MCG is a primary cell (PCell).

SCG: a set of serving cells, including secondary nodes, where a special cell in the SCG is a primary secondary cell (PSCell).

Further, the terminal device cannot feed back a PUCCH in all serving cells in the MCG and the SCG, and the network device implicitly divides the cell group (the MCG or the SCG) into two PUCCH groups by configuring a PUCCH cell parameter (i.e., pucch-cell) for each serving cell, where HARQ-ACK information corresponding to PDSCHs on cells in one PUCCH group is fed back on a special cell in the cell group, and HARQ-ACK information corresponding to PDSCHs on cells in the other PUCCH group is fed back on a configured PUCCH secondary cell (PUCCH SCell).

(3) PUCCH cell parameter (pucch-cell, corresponding to ServCellIndex), which is the ID of the serving cell (of the same cell group) to use for PUCCH. If the field is absent, the UE transmits the HARQ feedback on the PUCCH of the SpCell of this cell group, or on this serving cell if it is a PUCCH SCell.

(4) PDSCH processing time, as specified in standards, the terminal device provides valid HARQ-ACK information if the start of the 1st symbol of the PUCCH carrying the HARQ-ACK information (where the first symbol is determined according to an allocated HARQ-ACK slot k1 and the PUCCH resource) is not earlier than a first time after a last symbol of the PDSCH. The first time is a function of N1 (symbols), where N1 (symbols) is defined as in Tables 1 and 2 below.

TABLE 1

PDSCH processing time for PDSCH processing capability 1

| | PDSCH processing time N1 (symbols) | |
|---|---|---|
| $\mu$ | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

For example, when 1 U=1, on condition that a DMRS downlink configuration (DMRS-DownlinkConfig) in higher layer parameters dmrs-DownlinkForPDSCH-MappingTypeA and dmrs-DownlinkForPDSCH-MappingTypeB contains a DMRS additional position (dmrs-AdditionalPosition)='pos0', the first time is 10 symbols. When $\mu$=1, on condition that the DMRS Downlink Configuration (DMRS-DownlinkConfig) in the higher layer parameter dmrs-DownlinkForPDSCH-MappingTypeA or dmrs-DownlinkForPDSCH-MappingTypeB contains a DMRS additional position (dmrs-AdditionalPosition)≠'pos0' or no higher layer parameter is configured, the first time is 13 symbols.

TABLE 2

PDSCH processing time for PDSCH processing capability 2

| $\mu$ | PDSCH processing time N1 (symbols) dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 (frequency range 1) |

For example, when $\mu$=1, on condition that the DMRS downlink configuration (DMRS-DownlinkConfig) in the higher layer parameter dmrs-DownlinkForPDSCH-MappingTypeA and dmrs-DownlinkForPDSCH-MappingTypeB contains a DMRS additional position (dmrs-AdditionalPosition)='pos0', the first time is 4.5 symbols.

Release 17 (Rel-17) needs to better support dynamic spectrum sharing (DSS) for long term evolution (LTE) and new radio (NR). On carriers where LTE and NR coexist, in order to avoid interference to LTE systems, resources where LTE cell reference signals (CRSs) and LTE physical uplink control channels (PDCCHs) are located cannot be used for NR transmission. Therefore, on carriers shared by LTE and NR, the capacity of NR PDCCHs will be affected. The research on Rel-17 DSS aims to study a new mechanism to solve the capacity problem of the NR PDCCH. One DCI can be used to schedule PDSCHs of two different carriers. For example, one DCI on a PCell/SCell can schedule PDSCHs on a PCell and a SCell. Therefore, for different DCI indicator fields, whether an isolation design is required for PDSCHs of two cells is a problem to be solved first. If all indicator fields of the DCI have an isolation design for PDSCHs of multiple cells, although the scheduling flexibility can be improved, the overhead of the DCI format is large. If as many indicator fields of the DCI as possible are multiplexed, although the capacity of the PDCCH can be increased, the scheduling flexibility will be affected.

In order to solve the above technical problem, implementations of the disclosure provide the following solution.

Figure 2:
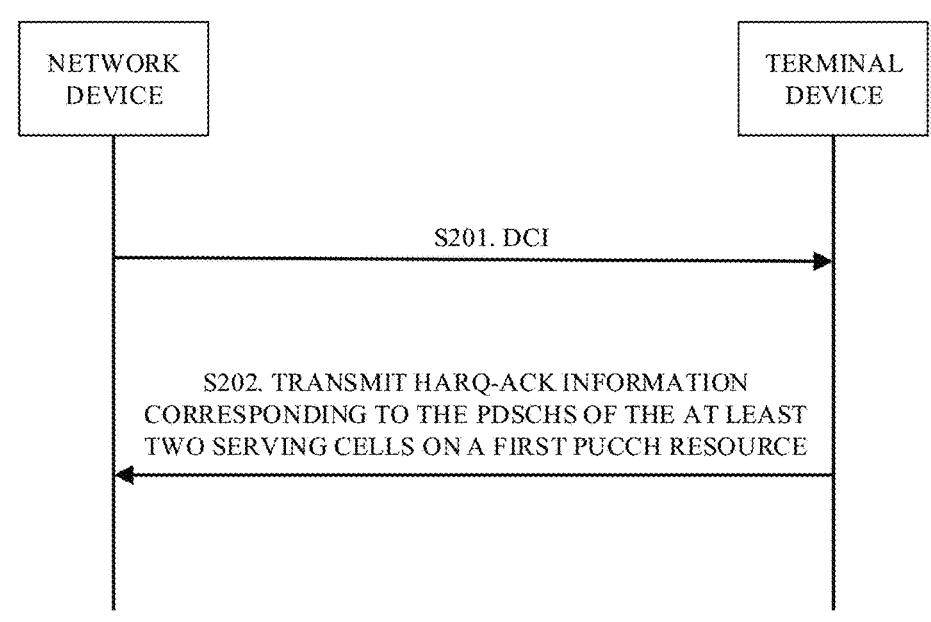
FIG. 2 is a schematic flowchart of a method for uplink transmission provided in implementations of the disclosure.

As illustrated in FIG. 2, FIG. 2 is a schematic flowchart of a method for uplink transmission provided in implementations of the disclosure. The operations in implementations of the disclosure at least include the following.

S201. A terminal device receives a DCI from a network device, where the DCI is used to schedule PDSCHs of at least two serving cells.

Optionally, the terminal device may receive PUCCH cell parameters configured for the at least two serving cells from the network device before receiving the DCI from the network device. The PUCCH cell parameter may implicitly indicate that cells in a MCG or a SCG is divided into two PUCCH groups, where HARQ-ACK information corresponding to PDSCHs on cells in one PUCCH group is fed back on a special cell in the cell group, and HARQ-ACK information corresponding to PDSCHs on cells in the other PUCCH group is fed back on a configured PUCCH SCell.

The at least two serving cells (corresponding to at least two carriers) belong to a same PUCCH group, and each PUCCH group includes multiple serving cells, which specifically includes the following cases.

In a first case, the at least two serving cells have a same PUCCH cell parameter.

In a second case, on condition that a first serving cell among the at least two serving cells is a special cell in a cell group to which the first serving cell belongs, a PUCCH cell parameter of any serving cell among the at least two serving cells other than the first serving cell indicates the special cell, or any serving cell among the at least two serving cells other than the first serving cell is not configured with a PUCCH cell parameter by the network device.

In a third case, a first serving cell among the at least two serving cells is a PUCCH secondary cell, and PUCCH cell parameters of serving cells among the at least two serving cells other than the first serving cell each indicate the PUCCH secondary cell.

For example, the network device configures for the terminal device two cell groups, namely a MCG and a SCG. For example, for the MCG, the MCG includes eight serving cells (cell #1 to cell #8), where the PCell is cell #1 and cell #1 is the special cell in the MCG. The network device configures pucch-cell as cell #1 in PDSCH serving cell configurations (PDSCH-ServingCellConfig) of cell #2 to cell #4, and configures pucch-cell as cell #8 in serving cell configurations of cell #5 to cell #8. Then, cell #8 is a PUCCH SCell, cell #1 to cell #4 form PUCCH group 1, cell #5 to cell #8 form PUCCH group 2.

The terminal device supports scheduling PDSCH transmission of at least two serving cells by one DCI, then the terminal device receives a DCI format transmitted by the network device. The DCI format is used to schedule PDSCHs of at least two serving cells. The at least two serving cells may be any N cells from cell #1 to cell #4, or may be any N cells from cell #5 to cell #8. The terminal device does not expect that some carriers scheduled by the DCI format belong to cell #1 to cell #4 (PUCCH group 1) and some carriers scheduled by the DCI format belong to cell #5 to cell #8 (PUCCH group 2). N is 2, 3, or 4.

S202. The terminal device transmits HARQ-ACK information corresponding to the PDSCHs of the at least two serving cells on a first PUCCH resource.

Optionally, if an x-th PDSCH among the PDSCHs of the at least two serving cells ends in slot $n_x$ (or an x-th PDSCH reception among PDSCH receptions of the at least two serving cells ends in slot $n_x$), where x=1, 2, . . . , N, N represents a total number of the at least two serving cells, and N is an integer greater than or equal to 2, after transmitting the DCI to the terminal device, the network device may transmit the PDSCHs of the at least two serving cells to the terminal device, and the terminal device provides the HARQ-ACK information in a first slot according to reception of the PDSCHs of the at least two serving cells, i.e., transmits the HARQ-ACK information corresponding to the PDSCHs of the at least two serving cells to the network device in the first slot. The network device receives the corresponding HARQ-ACK information in the first slot, where the first slot is determined as follows.

In an optional implementation, the network device can configure PDSCH-to-HARQ-ACK feedback timing indication information via a higher layer signaling, where the higher layer signaling can be a radio resource control (RRC), a system information block (SIB), or a media access control (MAC). Alternatively, the DCI contains the PDSCH-to-HARQ-ACK feedback timing indication information. The terminal device may determine the first slot according to the PDSCH-to-HARQ-ACK feedback timing indication information (PDSCH-to-HARQ_feedback timing indicator), where the PDSCHs of the at least two serving cells may or may not share the PDSCH-to-HARQ-ACK feedback timing indication information.

Further, the terminal device may determine a first slot offset value k of the x-th PDSCH to a HARQ-ACK feedback according to the PDSCH-to-HARQ-ACK feedback timing indication information, where the PDSCH-to-HARQ-ACK feedback timing indication information is used to determine a first slot offset value of each of PDSCHs of the N serving cells to the HARQ-ACK feedback. For example, a first slot offset value of a PDSCH of an x-th serving cell among the N serving cells to the HARQ-ACK feedback corresponds to the first slot offset value $k_x$ of the x-th PDSCH to the HARQ-ACK feedback. The first slot is then determined according to $n_x$ and $k_x$, where x=1, 2, . . . , N, N represents the total number of the at least two serving cells, and N is an integer greater than or equal to 2. The first slot is specifically determined as follows.

First, the network device configures a first parameter for different serving cells via a higher layer signaling. The first parameter can be dl-DataToUL-ACK, dl-DataToUL-ACK-r16, or dl-DataToUL-ACKForDCIFormat1_2. The first parameter indicates a candidate set of slot offsets between a PDSCH to a HARQ-ACK. Second, for each of the PDSCHs of the at least two serving cells, the terminal device selects a first slot offset value of the PDSCH to the HARQ-ACK feedback from the candidate set of slot offsets according to the PDSCH-to-HARQ feedback timing. For example, a first slot offset value of a PDSCH of a 1st serving cell to the HARQ-ACK feedback is $k_1$, a first slot offset value of a PDSCH of a 2nd serving cell to the HARQ-ACK feedback is $k_2$, . . . , and a first slot offset value of a PDSCH of an x-th serving cell to the HARQ-ACK feedback is $k_x$. Then, a slot set $\{n_x+k_x\}$ is determined.

In an example, the PDSCH of the 1st serving cell ends in slot $n_1$ and the slot offset value of the PDSCH to the HARQ-ACK feedback is $k_1$ then the first slot is slot $n_1+k_1$, the PDSCH of the 2nd serving cell ends in slot $n_2$ and the slot offset value of the PDSCH to the HARQ-ACK feedback is $k_2$, then the second slot is slot $n_2+k_2$, . . . , the PDSCH of the x-th serving cell ends in slot $n_x$ and the slot offset value of the PDSCH to the HARQ-ACK feedback is $k_x$ then the x-th slot is slot $n_x+k_x$, . . . , and the PDSCH of the N-th serving cell ends in slot $n_N$ and the slot offset value of the PDSCH to the HARQ-ACK feedback is $k_N$, then the N-th slot is slot $n_N+k_N$.

Finally, the first slot is determined according to the slot set $\{n_x+k_x\}$. The slot set $\{n_x, +k_x\}$ represents a set of slots where PUCCHs carrying the HARQ-ACK information corresponding to the PDSCHs of the at least two serving cells are located. The slot set $\{n_x+k_x\}$ includes slot $n_1+k_1$, slot $n_2+k_2$, . . . , slot $n_x+k_x$, . . . , and slot $n_N+k_N$. The following optional manners are included.

In a first optional manner, the first slot is an earliest slot or a slot with a smallest slot number in a slot set $\{n_x+k_x\}$. In this manner, the feedback delay of the HARQ-ACK information can be reduced.

For example, the slot set $\{n_x+k_x\}$ includes 3 slots, where the first slot is slot 4, the second slot is slot 5, and the third slot is slot 6, then the first slot is determined as slot 4.

In a second optional manner, the first slot is a last slot or a slot with a largest slot number in the slot set $\{n_x+k_x\}$. In this manner, all PDSCHs of different serving cells can be processed.

For example, the slot set $\{n_x+k_x\}$ includes 3 slots, where the first slot is slot 4, the second slot is slot 5, and the third slot is slot 6, then the first slot is determined as slot 6.

In a third optional manner, the first slot is a slot corresponding to a serving cell with a smallest serving cell index or a largest serving cell index among the at least two serving cells in the slot set $\{n_x+k_x\}$. It should be noted that, $n_x+k_x$ can be determined for the PDSCH of each serving cell among the N serving cells. The first slot is slot $n_m+k_m$ corresponding to a serving cell with the smallest serving cell index or the largest serving cell index among the N serving cells, where the m-th serving cell has the smallest or largest serving cell index.

For example, the slot set $\{n_x+k_x\}$ includes 3 slots, where the first slot is slot 4 and corresponds to cell #1, the second slot is slot 5 and corresponds to cell #2, and the third slot is slot 6 and corresponds to cell #3. Cell #1 has the smallest serving cell index among cell #1 to cell #3, and cell #3 has the largest serving cell index among cell #1 to cell #3. Therefore, slot 4 or slot 6 can be selected as the first slot.

A fourth optional manner includes the following.

A case where the total number N of serving cells scheduled by the DCI is 2 is discussed. The first slot is the earliest slot or the slot with the smallest slot number in the slot set $\{n_x+k_x\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k_x\}$. The first slot is the last slot or the slot with the largest slot number in the slot set $\{n_x+k_x\}$ on condition that the start of the 1st uplink symbol of the first PUCCH resource is earlier than the first time. The first time is agreed upon by protocol, and the number of symbols in the first time is as illustrated in Tables 1 and 2 above.

For example, the first slot is slot $n_1+k_1$, and the second slot is slot $n_2+k_2$. If the start of the 1st uplink symbol of the PUCCH determined according to $\min\{n_1+k_1, n_2+k_2\}$ is not earlier than the first time after the end symbol (or the last end symbol) of the two PDSCHs, the terminal device determines the first slot according to $\min\{n_1+k_1, n_2+k_2\}$. Otherwise, the terminal device determines the first slot according to $\max\{n_1+k_1, n_2+k_2\}$.

A case where the total number N of serving cells scheduled by the DCI is more than 2 is discussed. The first slot may be an earliest slot or a slot with a smallest slot number satisfying a first condition in the slot set $\{n_x+k_x\}$. The first condition is that a start of a 1st uplink symbol of the first PUCCH resource in the slot set $\{n_x+k_x\}$ is not earlier than a first time after an end symbol of any of the PDSCHs of the at least two serving cells or a first time after a last end symbol corresponding to all of the PDSCHs of the at least two serving cells. The first slot is the last slot or the slot with the largest slot number in the slot set $\{n_x+k_x\}$ on condition that no slot in the slot set $\{n_x+k_x\}$ satisfies the first condition.

For example, arrange $n_1+k_1$, $n_2+k_2$, . . . , $n_N+k_N$ in ascending order as $n_{m1}+k_{m1}$, $n_{m2}+k_{m2}$, . . . , $n_{mN}+k_{mN}$. Starting from $n_{m1}+k_{m1}$, determine whether the first slot satisfies the first condition according to $n_{mx}+k_{mx}$ (x=1, 2, . . . , N) in order. If the first slot satisfies the first condition, the first slot is determined as slot $n_{mx}+k_{mx}$. If the first slot fails to satisfy the first condition, further determine whether the first slot satisfies the first condition according to $n_{mx+1}+k_{mx+1}$, until the first condition can be satisfied. If even the last slot $n_{mN}+k_{mN}$ fails to satisfy the first condition, the first slot is determined as slot $n_{mN}+k_{mN}$.

In a fifth optional manner, the first slot is any slot in the slot set $\{n_x+k_x\}$. On condition that the first slot includes any slot in the slot set $\{n_x+k_x\}$, the terminal device expects that all slots in the slot set $\{n_x+k_x\}$ are the same or the terminal device does not expect that slots in the slot set $\{n_x+k_x\}$ are different. In this manner, the flexibility of PDSCHs of different serving cells in different slots is preserved, and the DCI indicator field can be shared, thereby reducing the overhead of the DCI.

In a case where the total number N of serving cells scheduled by the DCI is 2, the above manners of determining the first slot are comprehensively described as examples.

The network device configures two sets of first parameters for the terminal device to indicate a candidate set of slot offsets between a PDSCH to a HARQ-ACK feedback, where a first set of first parameters corresponds to a serving cell with a low carrier index and a second set of first parameters corresponds to a serving cell with a high carrier index. Assuming that the first set of parameters is {2, 3, 4, 5, 6, 7, 8, 9} and the second set of parameters is {1, 2, 3, 4, 5, 6, 7, 8}, the terminal device receives a DCI transmitted by the network device. The DCI is used to schedule PDSCHs of two serving cells, namely serving cell 1 (cell 1) and serving cell 2 (cell 2). The DCI contains a PDSCH-to HARQ_feedback timing indicator 00, which indicates the first value of the first set of parameters and the first value of the second set of parameters. Then, the PDSCH of cell 1 corresponds to a HARQ-ACK timing $k_1=2$, and the PDSCH of cell 2 corresponds to a HARQ-ACK timing $k_2=1$.

Figure 3:
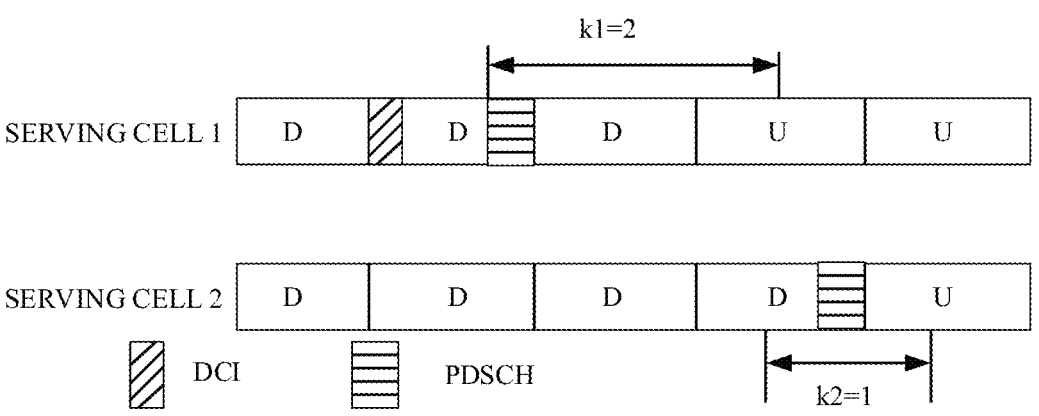
FIG. 3 is a schematic diagram of a resource scheduling slot provided in implementations of the disclosure.

As illustrated in FIG. 3, for serving cell 1, the PDSCH scheduled by the DCI ends at the second slot, and the HARQ-ACK timing corresponding to the PDSCH of cell 1 is $k_1=2$. For serving cell 2, the PDSCH scheduled by the DCI ends at the fourth slot, and the HARQ-ACK timing corresponding to the PDSCH of cell 1 is $k_2=1$. If the first optional manner is adopted, the terminal device determines that a slot where HARQ-ACK information corresponding to two PDSCHs of cell 1 and cell 2 is located is the fourth slot. If the second optional manner is adopted, the terminal device determines that the slot where the HARQ-ACK information corresponding to the two PDSCHs of cell 1 and cell 2 is located is the fifth slot. If the third optional manner is adopted, the terminal device determines that the slot where the HARQ-ACK information corresponding to the two PDSCHs of cell 1 and cell 2 is located is the fourth slot. If the fourth optional manner is adopted, if a PUCCH resource contained in the fourth slot satisfy a processing time of PDSCH 1 and PDSCH 2, the terminal device determines that the slot where the HARQ-ACK information corresponding to the two PDSCHs of cell 1 and cell 2 is located is the fourth slot, and if the PUCCH resource contained in the fourth slot fails to satisfy the processing time of PDSCH 1 or PDSCH 2, the terminal device determines that the slot where the HARQ-ACK information corresponding to the two PDSCHs of cell 1 and cell 2 is located is the fifth slot.

Figure 4:
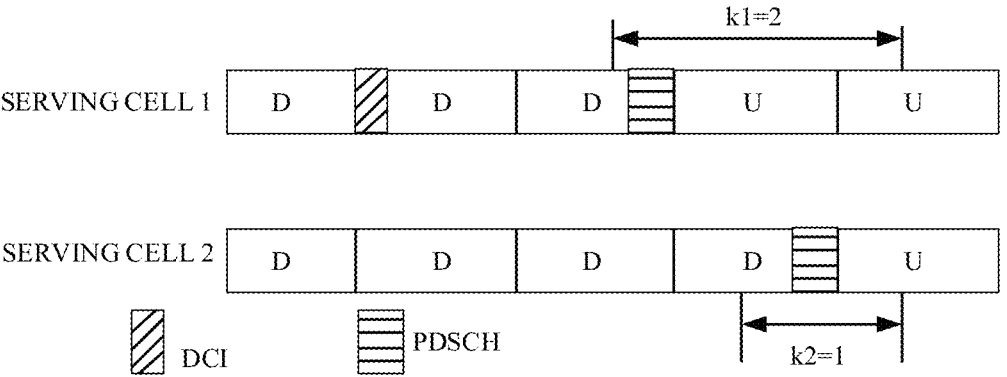
FIG. 4 is a schematic diagram of another resource scheduling slot provided in implementations of the disclosure.

If the fifth optional manner is adopted, the scheduling illustrated in FIG. 3 is unreasonable, i.e., the terminal device does not expect the fourth slot and the fifth slot to be different slots. As illustrated in FIG. 4, the PDSCH of cell 1 corresponds to a HARQ-ACK timing $k_1=2$, and the PDSCH of cell 2 corresponds to a HARQ-ACK timing $k_2=1$. The PDSCH on cell 1 is in slot 3 and the PDSCH on cell 2 is in slot 4. Then, the first slot determined according to $n_1+k_1$ and the first slot determined according to $n_2+k_2$ are both slot 5. Therefore, the scheduling is reasonable, and the terminal device determines that the slot where the HARQ-ACK information corresponding to the two PDSCHs of cell 1 and cell 2 is located is the fifth slot.

In another optional implementation, the terminal device may first determine a second slot offset value k according to the PDSCH-to-HARQ-ACK feedback timing indication information. The second slot offset value k is determined by the terminal device according to the PDSCH-to-HARQ-ACK feedback timing indication information and/or a set of second slot offset values. The set of second slot offset values is agreed upon by protocol or configured by the network device via a higher layer signaling, where the higher layer signaling includes an RRC, an SIB, and a MAC. A determination manner of the second slot offset value is similar to that of the first slot offset value and can refer to the determination manner of the first slot offset value described above, which is not repeated herein. It should be noted that the set of second slot offset values can be applied to at least two serving cells, and a slot offset of a PDSCH to a HARQ-ACK feedback for each of the at least two serving cells is the second slot offset value k.

Then, the terminal device determines a slot set $\{n_x+k\}$ according to slot $n_x$ and k. For example, the PDSCH of the 1st serving cell ends in slot $n_1$ and the slot offset value of the PDSCH to the HARQ-ACK feedback is k, then the first slot is $n_1+k$, the PDSCH of the 2nd serving cell ends in slot $n_2$ and the slot offset value of the PDSCH to the HARQ-ACK feedback is k, then the second slot is $n_2+k$, . . . , the PDSCH of the x-th serving cell ends in slot $n_x$ and the slot offset value of the PDSCH to the HARQ-ACK feedback is k, then the x-th slot is $n_x+k$, . . . , and the PDSCH of the N-th serving cell ends in slot $n_N$ and the slot offset value of the PDSCH to the HARQ-ACK feedback is k, then the N-th slot is $n_N+k$.

Finally, the terminal device determines the first slot according to the slot set $\{n_x+k\}$. The slot set $\{n_x+k\}$ represents a set of slots where PUCCHs carrying the HARQ-ACK information corresponding to the PDSCHs of the at least two serving cells are located. The slot set $\{n_x+k\}$ includes slot $n_1+k$, slot $n_2+k$, . . . , slot $n_x+k$, . . . , and slot $n_N+k$. The first slot is specifically determined as follows.

In a first optional manner, the first slot is an earliest slot or a slot with a smallest slot number in a slot set $\{n_x+k\}$. In this manner, the feedback delay of the HARQ-ACK information can be reduced.

For example, the slot set $\{n_x+k\}$ includes 3 slots, where the first slot is slot 4, the second slot is slot 5, and the third slot is slot 6, then the first slot is determined as slot 4.

In a second optional manner, the first slot is a last slot or a slot with a largest slot number in the slot set $\{n_x+k\}$. In this manner, all PDSCHs of different serving cells can be processed.

For example, the slot set $\{n_x+k\}$ includes 3 slots, where the first slot is slot 4, the second slot is slot 5, and the third slot is slot 6, then the first slot is determined as slot 6.

In a third optional manner, the first slot is a slot corresponding to a serving cell with a smallest serving cell index or a largest serving cell index among the at least two serving cells in the slot set $\{n_x+k\}$. It should be noted that, $n_x+k$ can be determined for the PDSCH of each serving cell among the N serving cells. The first slot is slot $n_m+k$ corresponding to a serving cell with the smallest serving cell index or the largest serving cell index among the N serving cells, where the m-th serving cell has the smallest or largest serving cell index.

For example, the slot set $\{n_x+k\}$ includes 3 slots, where the first slot is slot 4 and corresponds to cell #1, the second slot is slot 5 and corresponds to cell #2, and the third slot is slot 6 and corresponds to cell #3. Cell #1 has the smallest serving cell index among cell #1 to cell #3, and cell #3 has the largest serving cell index among cell #1 to cell #3. Therefore, slot 4 or slot 6 can be selected as the first slot.

A fourth optional manner includes the following.

A case where the total number N of serving cells scheduled by the DCI is 2 is discussed. The first slot is the earliest slot or the slot with the smallest slot number in the slot set $\{n_x+k\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k\}$. The first slot is the last slot or the slot with the largest slot number in the slot set $\{n_x+k\}$ on condition that the start of the 1st uplink symbol of the first PUCCH resource is earlier than the first time. The first time is agreed upon by protocol, and the number of symbols in the first time is as illustrated in Tables 1 and 2 above.

For example, the first slot is slot $n_1+k$, and the second slot is slot $n_2+k$. If the start of the 1st uplink symbol of the PUCCH determined according to $\min\{n_1+k, n_2+k\}$ is not earlier than the first time after the end symbol (or the last end symbol) of the two PDSCHs, the terminal device determines the first slot according to $\min\{n_1+k, n_2+k\}$. Otherwise, the terminal device determines the first slot according to $\max\{n_1+k, n_2+k\}$.

A case where the total number N of serving cells scheduled by the DCI is more than 2 is discussed. The first slot is an earliest slot or a slot with a smallest slot number satisfying a first condition (which can be understood as the PDSCH processing time above) in the slot set $\{n_x+k\}$. The first condition is that a start of a 1st uplink symbol of the first PUCCH resource in the slot set $\{n_x+k\}$ is not earlier than a first time after an end symbol of any of the PDSCHs of the at least two serving cells or a first time after a last end symbol corresponding to all of the PDSCHs of the at least two serving cells. The first slot is the last slot or the slot with the largest slot number in the slot set $\{n_x+k\}$ on condition that no slot in the slot set $\{n_x+k\}$ satisfies the first condition.

For example, arrange $n_1+k$, $n_2+k$, ..., $n_N+k$ in ascending order as $n_{m1}+k$, $n_{m2}+k$, ..., $n_{mN}+k$. Starting from $n_{m1}+k$, determine whether the first slot satisfies the first condition according to $n_{mx}+k$ (x=1, 2, ..., N) in order. If the first slot satisfies the first condition, the first slot is determined as slot $n_{mx}+k$. If the first slot fails to satisfy the first condition, further determine whether the first slot satisfies the first condition according to $n_{mx+1}+k$, until the first condition can be satisfied. If even the last slot $n_{mN}+k$ fails to satisfy the first condition, the first slot is determined as slot $n_{mN}+k$.

In a fifth optional manner, the first slot is any slot in the slot set $\{n_x+k\}$. The terminal device expects that all slots in the slot set $\{n_x+k\}$ are the same or the terminal device does not expect that slots in the slot set $\{n_x+k\}$ are different. In this manner, the flexibility of PDSCHs of different serving cells in different slots is preserved, and the DCI indicator field can be shared, thereby reducing the overhead of the DCI.

In implementations of the disclosure, the HARQ-ACK information corresponding to the PDSCHs of at least two carriers is scheduled to be fed back on the same PUCCH resource, thereby improving the utilization rate of the PUCCH resource, and the PUCCH resource indicator field in the DCI can be shared, thereby reducing the overhead of the DCI.

It can be understood that, in each of the foregoing method implementations, methods and operations implemented by a terminal device may also be implemented by a component (for example, a chip or a circuit) operable with the terminal device, and methods and operations implemented by the network device may also be implemented by a component (for example, a chip or a circuit) operable with the network device.

The solutions provided in implementations of the disclosure are introduced mainly from the perspective of interaction between network elements. It can be understood that, in order to implement the foregoing functions, various network elements, such as a transmitting-end device or a receiving-end device, include corresponding hardware structures and/or software modules for executing respective functions. Those of ordinary skill in the art will appreciate that units and algorithmic operations of various examples described in connection with implementations herein may be implemented by hardware or by a combination of hardware and computer software. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

In implementations of the disclosure, division of functional modules of a transmitting-end device or a receiving-end device may be implemented according to the foregoing method examples. For example, functional modules may be divided to correspond to respective functions, or two or more functions may be integrated into one processing module. The integrated module may be implemented in a form of hardware, or may be implemented in a form of software program module. It should be noted that, the division of modules in implementations of the disclosure is illustrative and is only a division of logical functions, and other manners of division may also available in practice. The following will take division of functional modules with regard to corresponding functions as an example for illustration.

The method provided in implementations of the disclosure is described in detail above with reference to FIG. 2, and a terminal device and a network device provided in implementations of the disclosure will be described in detail below with reference to FIGS. 5 to 6. It should be understood that, illustrations of implementations of the terminal device and the network device and illustrations of method implementations correspond to each other, and therefore, for parts not described in detail, reference can be made to the foregoing method implementations, which will not be described in detail again herein for the sake of brevity.

Figure 5:
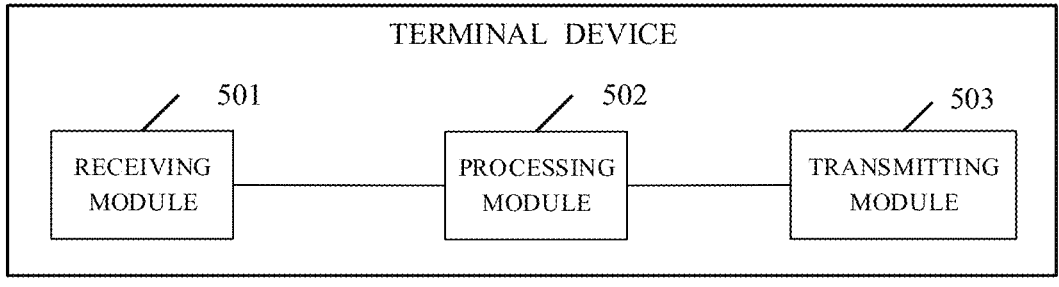
FIG. 5 is a schematic structural diagram of a terminal device provided in implementations of the disclosure.

Referring to FIG. 5, FIG. 5 is a schematic structural diagram of a terminal device provided in implementations of the disclosure. The terminal device may include a receiving module 501, a transmitting module 503, and optionally, a processing module 502. The receiving module 501 and the transmitting module 503 may communicate with an external party. The processing module 502 is configured to perform processing, for example, determining a first slot. The receiving module 501 and the transmitting module 503 may also be referred to as a communication interface, a transceiver unit, or a transceiver module. The receiving module 501 and the transmitting module 503 may be configured to perform the operations performed by the terminal device in method implementations above.

For example, the receiving module 501 and the transmitting module 503 may also be referred to as a transceiver module or a transceiver unit (including a receiving unit and/or a transmitting unit) for performing the operations of transmitting and receiving by the terminal device in method implementations above, respectively.

In one possible design, the terminal device may perform operations or processes corresponding to those performed by the terminal device in method implementations above. The receiving module 501 and the transmitting module 503 are configured to perform operations related to transmitting and receiving by the terminal device in method implementations above, and the processing module 502 is configured to perform operations related to processing by the terminal device in method implementations above. The receiving module 501 is configured to configured to receive a DCI from a network device, where the DCI is used to schedule PDSCHs of at least two serving cells. The transmitting module 503 is configured to transmit HARQ-ACK information corresponding to the PDSCHs of the at least two serving cells on a first PUCCH resource.

Optionally, the at least two serving cells belong to a same PUCCH group.

Optionally, the processing module 502 is configured to provide the HARQ-ACK information in a first slot if an x-th PDSCH among the PDSCHs of the at least two serving cells ends in slot $n_x$, where x=1, 2, . . . , N, N represents a total number of the at least two serving cells, and N is an integer greater than or equal to 2.

Optionally, the processing module 502 is further configured to determine the first slot according to PDSCH-to-HARQ-ACK feedback timing indication information, where the PDSCH-to-HARQ-ACK feedback timing indication information is configured by the network device via a higher layer signaling or is contained in the DCI.

Optionally, the processing module 502 is further configured to determine a first slot offset value $k_x$ of the x-th PDSCH to a HARQ-ACK feedback according to the PDSCH-to-HARQ-ACK feedback timing indication information, and determine the first slot according to the slot $n_x$ and $k_x$.

Optionally, the first slot includes one of: an earliest slot or a slot with a smallest slot number in a slot set $\{n_x+k_x\}$, a last slot or a slot with a largest slot number in a slot set $\{n_x+k_x\}$, a slot corresponding to a serving cell with a smallest serving cell index or a largest serving cell index among the at least two serving cells in a slot set $\{n_x+k_x\}$, any slot in a slot set $\{n_x+k_x\}$, an earliest slot or a slot with a smallest slot number satisfying a first condition in a slot set $\{n_x+k_x\}$, or a last slot or a slot with a largest slot number in a slot set $\{n_x+k_x\}$ on condition that no slot in the slot set $\{n_x+k_x\}$ satisfies a first condition.

Optionally, on condition that the first slot includes any slot in the slot set $\{n_x+k_x\}$, the terminal device expects that all slots in the slot set $\{n_x+k_x\}$ are the same or the terminal device does not expect that slots in the slot set $\{n_x+k_x\}$ are different.

Optionally, the first slot is the earliest slot or the slot with the smallest slot number in the slot set $\{n_x+k_x\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k_x\}$.

Optionally, the first slot is the last slot or the slot with the largest slot number in the slot set $\{n_x+k_x\}$ on condition that the start of the 1st uplink symbol of the first PUCCH resource is earlier than the first time.

Optionally, the first condition is that a start of a 1st uplink symbol of the first PUCCH resource in the slot set $\{n_x+k_x\}$ is not earlier than a first time after an end symbol of any of the PDSCHs of the at least two serving cells or a first time after a last end symbol corresponding to all of the PDSCHs of the at least two serving cells.

Optionally, the processing module 502 is further configured to determine a second slot offset value k according to the PDSCH-to-HARQ-ACK feedback timing indication information, and determine the first slot according to the slot $n_x$ and k.

Optionally, the first slot includes one of: an earliest slot or a slot with a smallest slot number in a slot set $\{n_x+k\}$, a last slot or a slot with a largest slot number in a slot set $\{n_x+k\}$, a slot corresponding to a serving cell with a smallest serving cell index or a largest serving cell index among the at least two serving cells in a slot set $\{n_x+k\}$, any slot in a slot set $\{n_x+k\}$, an earliest slot or a slot with a smallest slot number satisfying a first condition in a slot set $\{n_x+k\}$, or a last slot or a slot with a largest slot number in a slot set $\{n_x+k\}$ on condition that no slot in the slot set $\{n_x+k\}$ satisfies a first condition.

Optionally, the first slot is the earliest slot or the slot with the smallest slot number in the slot set $\{n_x+k\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k\}$.

Optionally, the first slot is the last slot or the slot with the largest slot number in the slot set $\{n_x+k\}$ on condition that the start of the 1st uplink symbol of the first PUCCH resource is earlier than the first time.

Optionally, the first condition is that a start of a 1st uplink symbol of the first PUCCH resource in the slot set $\{n_x+k\}$ is not earlier than a first time after an end symbol of any of the PDSCHs of the at least two serving cells or a first time after a last end symbol corresponding to all of the PDSCHs of the at least two serving cells.

Optionally, the at least two serving cells correspond to a same PUCCH cell parameter.

Optionally, on condition that a first serving cell among the at least two serving cells is a special cell in a cell group to which the first serving cell belongs, a PUCCH cell parameter of any serving cell among the at least two serving cells other than the first serving cell indicates the special cell, or any serving cell among the at least two serving cells other than the first serving cell is not configured with a PUCCH cell parameter by the network device.

Optionally, a first serving cell among the at least two serving cells is a PUCCH secondary cell, and PUCCH cell parameters of serving cells among the at least two serving cells other than the first serving cell each indicate the PUCCH secondary cell.

Optionally, the receiving module 501 is further configured to receive a PUCCH cell parameter configured by the network device for each of the at least two serving cells.

It should be noted that, for the implementation of each module, reference can be made to corresponding illustrations in the method implementations illustrated in FIG. 2, to implement methods and functions executed by the terminal device in the foregoing implementations.

Figure 6:
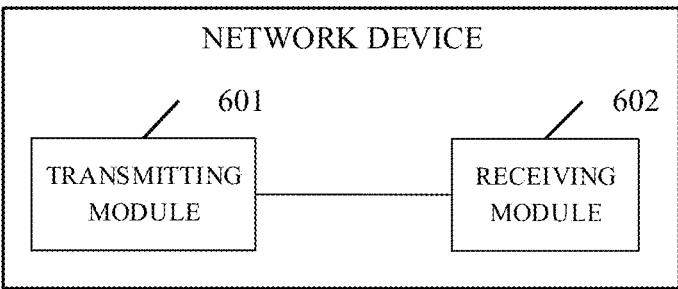
FIG. 6 is a schematic structural diagram of a network device provided in implementations of the disclosure.

Referring to FIG. 6, FIG. 6 is a schematic structural diagram of a network device provided in implementations of the disclosure. The network device may include a transmitting module 601 and a receiving module 602. The transmitting module 601 and the receiving module 602 may communicate with an external party. The transmitting module 601 and the receiving module 602 may also be referred to as a communication interface, a transceiver module, or a transceiver unit. The transmitting module 601 and the receiving module 602 may be configured to perform operations performed by the network device in method implementations above.

For example, the transmitting module 601 and the receiving module 602 may also be referred to as a transceiver module or a transceiver unit (including a transmitting unit and/or a receiving unit) for performing the operations of transmitting and receiving by the network device in method implementations above, respectively.

In one possible design, the network device may perform operations or processes corresponding to those performed by the network device in method implementations above. The transmitting module 601 and the receiving module 602 are configured to perform operations related to transmitting and receiving on the network device side in method implementations above. The transmitting module 601 is configured to transmit a DCI to a terminal device, where the DCI is used to schedule PDSCHs of at least two serving cells. The receiving module 602 is configured to receive HARQ-ACK information corresponding to the PDSCHs of the at least two serving cells from the terminal device on a first PUCCH resource.

Optionally, the at least two serving cells belong to a same PUCCH group.

Optionally, the receiving module 602 is further configured to: receive the HARQ-ACK information in a first slot if an x-th PDSCH among the PDSCHs of the at least two serving cells ends in slot $n_x$, where x=1, 2, . . . , N, N represents a total number of the at least two serving cells, and N is an integer greater than or equal to 2.

Optionally, the first slot is determined according to PDSCH-to-HARQ-ACK feedback timing indication information, and the PDSCH-to-HARQ-ACK feedback timing indication information is configured by the network device via a higher layer signaling or is contained in the DCI.

Optionally, the PDSCH-to-HARQ-ACK feedback timing indication information is used to determine a first slot offset value $k_x$ of the x-th PDSCH to a HARQ-ACK feedback, and the first slot is determined according to the slot $n_x$ and $k_x$.

Optionally, the first slot includes one of: an earliest slot or a slot with a smallest slot number in a slot set $\{n_x+k_x\}$, a last slot or a slot with a largest slot number in a slot set $\{n_x+k_x\}$, a slot corresponding to a serving cell with a smallest serving cell index or a largest serving cell index among the at least two serving cells in a slot set $\{n_x+k_x\}$, any slot in a slot set $\{n_x+k_x\}$, an earliest slot or a slot with a smallest slot number satisfying a first condition in a slot set $\{n_x+k_x\}$, or a last slot or a slot with a largest slot number in a slot set $\{n_x+k_x\}$ on condition that no slot in the slot set $\{n_x+k_x\}$ satisfies a first condition.

Optionally, on condition that the first slot includes any slot in the slot set $\{n_x+k_x\}$, the terminal device expects that all slots in the slot set $\{n_x+k_x\}$ are the same or the terminal device does not expect that slots in the slot set $\{n_x+k_x\}$ are different.

Optionally, the first slot is the earliest slot or the slot with the smallest slot number in the slot set $\{n_x+k_x\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k_x\}$.

Optionally, the first slot is the last slot or the slot with the largest slot number in the slot set $\{n_x+k_x\}$ on condition that the start of the 1st uplink symbol of the first PUCCH resource is earlier than the first time.

Optionally, the first condition is that a start of a 1st uplink symbol of the first PUCCH resource in the slot set $\{n_x+k_x\}$ is not earlier than a first time after an end symbol of any of the PDSCHs of the at least two serving cells or a first time after a last end symbol corresponding to all of the PDSCHs of the at least two serving cells.

Optionally, the PDSCH-to-HARQ-ACK feedback timing indication information is used to determine a second slot offset value k, and the first slot is determined according to the slot $n_x$ and k.

Optionally, the first slot includes one of: an earliest slot or a slot with a smallest slot number in a slot set $\{n_x+k\}$, a last slot or a slot with a largest slot number in a slot set $\{n_x+k\}$, a slot corresponding to a serving cell with a smallest serving cell index or a largest serving cell index among the at least two serving cells in a slot set $\{n_x+k\}$, any slot in a slot set $\{n_x+k\}$, an earliest slot or a slot with a smallest slot number satisfying a first condition in a slot set $\{n_x+k\}$, or a last slot or a slot with a largest slot number in a slot set $\{n_x+k\}$ on condition that no slot in the slot set $\{n_x+k\}$ satisfies a first condition.

Optionally, the first slot is the earliest slot or the slot with the smallest slot number in the slot set $\{n_x+k\}$ on condition that a start of a 1st uplink symbol of the first PUCCH resource is not earlier than one of: a first time after an end symbol of any of the PDSCHs of the at least two serving cells, or a first time after a last end symbol corresponding to all of the PDSCHs of the at least two serving cells, where the first PUCCH resource is located in the earliest slot or the slot with the smallest slot number in the slot set $\{n_x+k\}$.

Optionally, the first slot is the last slot or the slot with the largest slot number in the slot set $\{n_x+k\}$ on condition that the start of the 1st uplink symbol of the first PUCCH resource is earlier than the first time.

Optionally, the first condition is that a start of a 1st uplink symbol of the first PUCCH resource in the slot set $\{n_x+k\}$ is not earlier than a first time after an end symbol of any of the PDSCHs of the at least two serving cells or a first time after a last end symbol corresponding to all of the PDSCHs of the at least two serving cells.

Optionally, the at least two serving cells correspond to a same PUCCH cell parameter.

Optionally, on condition that a first serving cell among the at least two serving cells is a special cell in a cell group to which the first serving cell belongs, a PUCCH cell parameter of any serving cell among the at least two serving cells other than the first serving cell indicates the special cell, or any serving cell among the at least two serving cells other than the first serving cell is not configured with a PUCCH cell parameter by the network device.

Optionally, a first serving cell among the at least two serving cells is a PUCCH secondary cell, and PUCCH cell parameters of serving cells among the at least two serving cells other than the first serving cell each indicate the PUCCH secondary cell.

Optionally, the transmitting module 601 is further configured to: transmit a PUCCH cell parameter configured for each of the at least two serving cells to the terminal device.

It should be noted that, for the implementation of each module, reference can be made to corresponding illustrations in the method implementations illustrated in FIG. 6, to implement methods and functions executed by the network device in the foregoing implementations.

Figure 7:
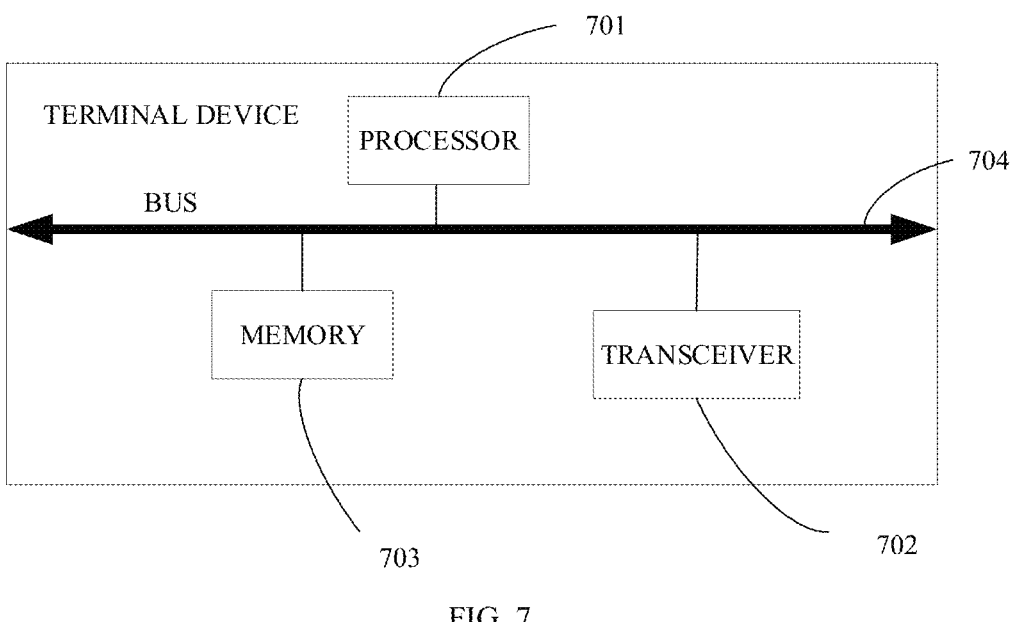
FIG. 7 is a schematic structural diagram of another terminal device provided in implementations of the disclosure.

FIG. 7 is a schematic structural diagram of a terminal device provided in implementation of the disclosure. The terminal device can be applied to the system illustrated in FIG. 1, and perform steps or processes performed by the terminal device in the foregoing method implementations.

As illustrated in FIG. 7, the terminal device includes a processor 701 and a transceiver 702. Optionally, the terminal device further includes a memory 703. The processor 701, the transceiver 702, and the memory 703 may communicate with each other through an internal connection path to transmit control signals and/or data signals. The memory 703 is configured to store computer programs. The processor 701 is configured to invoke and execute the computer programs stored in the memory 703 to control the transceiver 702 to receive and transmit signals. Optionally, the terminal device can further include an antenna. The antenna is configured to send, via a radio signal, uplink (UL) data or UL control signaling output by the transceiver 702.

The processor 701 and the memory 703 above may be combined into a processing apparatus, and the processor 701 is configured to execute program codes stored in the memory 703 to implement the foregoing functions. During implementation, the memory 703 may also be integrated in the processor 701, or be independent of the processor 701. The processor 701 may correspond to the processing module in FIG. 5.

The transceiver 702 may correspond to the receiving module and the transmitting module in FIG. 5, and may also be referred to as a transceiver unit or a transceiver module. The transceiver 702 may include a receiver (or referred to as a receiver, a receiving circuit) and a transmitter (or referred to as a transmitter, a transmitting circuit). The receiver is configured to receive a signal, and the transmitter is configured to transmit the signal.

It should be understood that, the terminal device illustrated in FIG. 7 can implement various processes involving the terminal device in the method implementations illustrated in FIG. 2. Operations and/or functions of various modules in the terminal device are intended to implement corresponding processes in the foregoing method implementations. For details thereof, reference can be made to the illustrations in the foregoing method implementations, and detailed elaborations are properly omitted herein to avoid repetition.

The processor 701 may be configured to execute actions that are implemented inside the terminal device described in the foregoing method implementations, and the transceiver 702 may be configured to execute actions of transmission and reception of the terminal device and described in the foregoing method implementations. For details thereof, reference can be made to the illustrations in the foregoing method implementations, which will not described in detail again herein.

The processor 701 may be a central processing unit, a general-purpose processor, a digital signal processor, an application-specific integrated circuit, a field programmable gate array, or other programmable logic devices, transistor logic devices, hardware components, or any combination thereof. It may implement or perform various illustrative logical blocks, modules, and circuits described in connection with the disclosure. The processor 701 may also be a combination that implements a computing function, for example, a combination that includes one or more microprocessors, a combination of digital signal processor and microprocessor, and the like. A communication bus 704 may be a peripheral component interconnect (PCI) bus, an extended industry standard architecture (EISA) bus, or the like. The bus may be classified into an address bus, a data bus, a control bus, and the like. For the ease of illustration, only one thick line is used in FIG. 7 for illustration, but does not mean that there is only one bus or one type of bus. The communication bus 704 is configured to implement connection and communication between these components. The transceiver 702 in implementations of the disclosure is configured to perform signaling communication or data communication with another node device. The memory 703 may include a volatile memory, such as a nonvolatile random access memory (NVRAM), a phase change RAM (PRAM), a magnetoresistive RAM (MRAM), etc.; and may further include a non-volatile memory, for example, at least one magnetic disk storage device, an electrically erasable programmable read-only memory (EEPROM), a flash memory device such as a NOR flash memory or a NAND flash memory, a semiconductor device such as a solid state disk (SSD), etc. Optionally, the memory 703 may also be at least one storage apparatus located far away from the processor 701. Optionally, the memory 703 may be further configured to store a set of computer program codes or configuration information. Optionally, the processor 701 may be further configured to execute programs stored in the memory 703. The processor may cooperate with the memory and the transceiver to execute any one of the methods and functions of the terminal device in the foregoing implementations of the disclosure.

Figure 8:
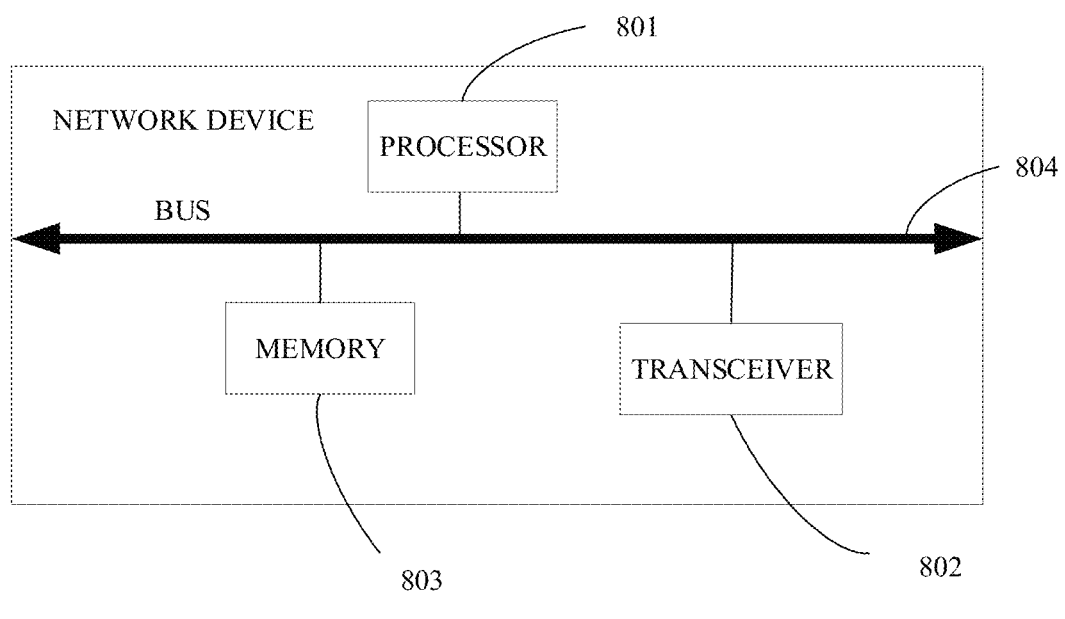
FIG. 8 is a schematic structural diagram of another network device provided in implementations of the disclosure.

FIG. 8 is a schematic structural diagram of a network device provided in implementations of the disclosure. The network device may be applied to the system illustrated in FIG. 1, and implement functions of the network device in the foregoing method implementations or perform steps or processes performed by the network device in the foregoing method implementations.

As illustrated in FIG. 8, the network device includes a processor 801 and a transceiver 802. Optionally, the network device further includes a memory 803. The processor 801, the transceiver 802, and the memory 803 may communicate with each other through an internal connection path to transmit control signals and/or data signals. The memory 803 is configured to store computer programs. The processor 801 is configured to invoke and execute the computer programs stored in the memory 803 to control the transceiver 802 to receive and transmit signals. Optionally, the network device can further include an antenna. The antenna is configured to send, via a radio signal, UL data or UL control signaling output by the transceiver 802.

The processor 801 and the memory 803 may be combined into a processing apparatus, and the processor 801 is configured to execute program codes stored in the memory 803 to implement the foregoing functions. During implementation, the memory 803 may also be integrated in the processor 801, or be independent of the processor 801.

The transceiver 802 may correspond to the receiving module and transmitting module in FIG. 6, and may also be referred to as transceiver unit or transceiver module. The transceiver 802 may include a receiver (or referred to as a receiver, a receiving circuit) and a transmitter (or referred to as a transmitter, a transmitting circuit). The receiver is configured to receive a signal, and the transmitter is configured to transmit the signal.

It should be understood that, the network device illustrated in FIG. 8 can implement various processes involving the network device in the method implementations illustrated in FIG. 2. Operations and/or functions of various modules in the network device are intended to implement corresponding processes in the foregoing method implementations. For details thereof, reference can be made to the illustrations in the foregoing method implementations, and detailed elaborations are properly omitted herein to avoid repetition.

The processor 801 may be configured to execute the actions implemented by the network device in the foregoing method implementations, and the transceiver 802 may be configured to execute the actions of transmission to the terminal device by the network device or reception from the terminal device by the network device in the foregoing method implementations. For details thereof, reference can be made to the illustrations in the foregoing method implementations, which will not be described in detail again herein.

The processor 801 may be various types of processors mentioned above. A communication bus 804 may be a PCI bus, an EISA bus, or the like. The bus may be classified into an address bus, a data bus, a control bus, and the like. For the ease of illustration, only one thick line is used in FIG. 8 for illustration, but does not mean that there is only one bus or one type of bus. The communication bus 804 is configured to implement connection and communication between these components. The transceiver 802 of the device in implementations of the disclosure is configured to perform signaling communication or data communication with other devices. The memory 803 may be various types of memories mentioned above. Optionally, the memory 803 may also be at least one storage apparatus located far away from the processor 801. The memory 803 is configured to store a set of computer program codes or configuration information, and the processor 801 is configured to execute programs in the memory 803. The processor can cooperate with the memory and the transceiver to execute any one of the methods and functions of the network device in the foregoing implementations of the disclosure.

Implementations of the disclosure further provide a system-on-chip (SOC). The SOC includes a processor. The processor is configured to support a terminal device or a network device to realize functions involved in any one of the foregoing implementations, for example, generate or process a first slot involved in the foregoing method. In a possible design, the SOC can further include a memory. The memory is configured to store program instructions and data that are necessary for a terminal device or a network device. The SOC may consist of a chip, or may include a chip as well as other discrete components. Input and output of the SOC respectively correspond to reception operations and transmission operations of a terminal device or a network device in the method implementations.

Based on the method provided in implementations of the disclosure, a computer program product is further provided in the disclosure. The computer program includes computer programs which, when executed by a computer, are operable with the computer to perform the method of any one of the implementations illustrated in FIG. 2.

Based on the method provided in implementations of the disclosure, a computer-readable medium is further provided in the disclosure. The computer-readable medium is configured to store computer programs which, when executed by a computer, are operable with the computer to implement the method in any one of the implementations illustrated in FIG. 2.

Based on the method provided in implementations of the disclosure, a system is further provided in the disclosure. The system includes one or more terminal devices and one or more network devices.

All or some of the foregoing implementations can be implemented through software, hardware, firmware, or any other combination thereof. When implemented by software, all or some of the foregoing implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for uplink transmission, comprising:
   receiving, by a terminal device, a downlink control information (DCI) from a network device, the DCI being used to schedule physical downlink shared channels (PDSCHs) of at least two serving cells;
   determining, by the terminal device, a slot offset value k according to PDSCH-to-HARQ-ACK feedback timing indication information, wherein the PDSCH-to-HARQ-ACK feedback timing indication information is configured by the network device via a higher layer signaling or is contained in the DCI;
   determining, by the terminal device, a first slot as a last slot in a slot set $\{n_x+k\}$, wherein an x-th PDSCH among the PDSCHs of the at least two serving cells ends in the slot $n_x$, where x=1, 2, . . . , N, N represents a total number of the at least two serving cells, and N is an integer greater than or equal to 2; and
   transmitting, by the terminal device, hybrid automatic repeat request (HARQ)-acknowledgement (ACK) information corresponding to the PDSCHs of the at least two serving cells on a first physical uplink control channel (PUCCH) resource in the first slot.

2. The method of claim 1, wherein the at least two serving cells belong to a same PUCCH group.

3. The method of claim 1, wherein the at least two serving cells correspond to a same PUCCH cell parameter.

4. The method of claim 1, wherein responsive to determining that a first serving cell among the at least two serving cells is a special cell in a cell group to which the first serving cell belongs, wherein the special cell is a primary cell or a primary secondary cell,
   a PUCCH cell parameter of any serving cell among the at least two serving cells other than the first serving cell indicates the special cell; or
   any serving cell among the at least two serving cells other than the first serving cell is not configured with a PUCCH cell parameter by the network device.

5. The method of claim 1, wherein a first serving cell among the at least two serving cells is a PUCCH secondary cell, and PUCCH cell parameters of serving cells among the at least two serving cells other than the first serving cell each indicate the PUCCH secondary cell.

6. The method of claim 1, further comprising:
   receiving, by the terminal device, a PUCCH cell parameter configured by the network device for each of the at least two serving cells.

7. A terminal device, comprising:

a memory configured to store computer programs; and a processor configured to execute the computer programs to cause the terminal device to:

receive a downlink control information (DCI) from a network device, the DCI being used to schedule physical downlink shared channels (PDSCHs) of at least two serving cells;

determine a slot offset value k according to PDSCH-to-HARQ-ACK feedback timing indication information, wherein the PDSCH-to-HARQ-ACK feedback timing indication information is configured by the network device via a higher layer signaling or is contained in the DCI;

determine a first slot as a last slot in a slot set $\{n_x+k\}$ wherein an x-th PDSCH among the PDSCHs of the at least two serving cells ends in the slot $n_x$, where $x=1, 2, \ldots, N$, N represents a total number of the at least two serving cells, and N is an integer greater than or equal to 2; and transmit hybrid automatic repeat request (HARQ)-acknowledgement (ACK) information corresponding to the PDSCHs of the at least two serving cells on a first physical uplink control channel (PUCCH) resource in the first slot.

8. The terminal device of claim 7, wherein the at least two serving cells belong to a same PUCCH group.

9. A network device, comprising:

a memory configured to store computer programs; and a processor configured to execute the computer programs to cause the network device to:

transmit a downlink control information (DCI) to a terminal device, the DCI being used to schedule physical downlink shared channels (PDSCHs) of at least two serving cells, wherein a slot offset value k is determined by the terminal device according to PDSCH-to-HARQ-ACK feedback timing indication information, wherein the PDSCH-to-HARQ-ACK feedback timing indication information is configured by the network device via a higher layer signaling or is contained in the DCI, and a first slot is determined by the terminal device as a last slot in a slot set $\{n_x+k\}$ wherein an x-th PDSCH among the PDSCHs of the at least two serving cells ends in the slot $n_x$, where $x=1, 2, \ldots, N$, N represents a total number of the at least two serving cells, and N is an integer greater than or equal to 2; and receive hybrid automatic repeat request (HARQ)-acknowledgement (ACK) information corresponding to the PDSCHs of the at least two serving cells from the terminal device on a first physical uplink control channel (PUCCH) resource in the first slot.

10. The network device of claim 9, wherein the at least two serving cells correspond to a same PUCCH cell parameter.

11. The network device of claim 9, wherein responsive to determining that a first serving cell among the at least two serving cells is a special cell in a cell group to which the first serving cell belongs, wherein the special cell is a primary cell or a primary secondary cell, a PUCCH cell parameter of any serving cell among the at least two serving cells other than the first serving cell indicates the special cell; or any serving cell among the at least two serving cells other than the first serving cell is not configured with a PUCCH cell parameter by the network device.

12. The network device of claim 9, wherein a first serving cell among the at least two serving cells is a PUCCH secondary cell, and PUCCH cell parameters of serving cells among the at least two serving cells other than the first serving cell each indicate the PUCCH secondary cell.

* * * * *